United States Patent
Hama et al.

(10) Patent No.: US 8,556,197 B2
(45) Date of Patent: Oct. 15, 2013

(54) PROCESS FOR PRODUCING SULFIDE-BASED SOLID ELECTROLYTE

(75) Inventors: Shigenori Hama, Susono (JP); Mitsuhiko Hayashi, Kani (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 385 days.

(21) Appl. No.: 13/001,708

(22) PCT Filed: Jul. 6, 2009

(86) PCT No.: PCT/IB2009/006164
§ 371 (c)(1),
(2), (4) Date: Dec. 28, 2010

(87) PCT Pub. No.: WO2010/004401
PCT Pub. Date: Jan. 14, 2010

(65) Prior Publication Data
US 2011/0108642 A1      May 12, 2011

(30) Foreign Application Priority Data

Jul. 7, 2008   (JP) .................................. 2008-176985
Jun. 23, 2009  (JP) .................................. 2009-148705

(51) Int. Cl.
*B02C 19/00*   (2006.01)
(52) U.S. Cl.
USPC .............................................. 241/21; 241/23
(58) Field of Classification Search
USPC .................................. 241/30, 175, 21, 16, 23
See application file for complete search history.

(56) References Cited

U.S. PATENT DOCUMENTS

| 2004/0058246 A1 | 3/2004 | Choi et al. |
| 2005/0107239 A1 | 5/2005 | Akiba et al. |
| 2010/0151335 A1 | 6/2010 | Senga et al. |

FOREIGN PATENT DOCUMENTS

| DE | 42 04 600 A1 | 8/1993 |
| EP | 0 802 575 A2 | 10/1997 |
| EP | 1 466 865 A1 | 10/2004 |
| JP | A-09-283156 | 10/1997 |
| JP | A-11-134937 | 5/1999 |
| JP | A-2003-208919 | 7/2003 |
| JP | A-2004-265685 | 9/2004 |
| JP | A-2009-110920 | 5/2009 |
| KR | 10-2004-0026207 | 3/2004 |
| TW | 200305889 | 11/2003 |
| WO | WO 2007/015409 A1 | 2/2007 |

OTHER PUBLICATIONS

T. Kondo et al., "Microstructure and hydrogen absorption-desorption properties of Mg-TiFe$_{0.92}$Mn$_{0.08}$ composites prepared by wet mechanical milling" *Journal of Alloys and Compounds*, 2004, vol. 375, No. 1-2, pp. 283-291.
International Search Report issued in Application No. PCT/IB2009/006164; dated Oct. 23, 2009.
Written Opinion of the International Searching Authority issued in Application No. PCT/IB2009/006164; dated Oct. 23, 2009.
International Preliminary Report on Patentability issued in Application No. PCT/IB2009/006164; dated Sep. 29, 2010.

*Primary Examiner* — Mark Rosenbaum
(74) *Attorney, Agent, or Firm* — Oliff & Berridge, PLC

(57) ABSTRACT

The invention provides a process for producing a sulfide-based solid electrolyte, the process having: a raw material composition preparation step for preparing a raw material composition containing at least sulfur (S), an adhesion inhibitor addition step for adding to the raw material composition an adhesion inhibitor that inhibits formation of adhered substances including the unreacted raw material composition, on the inner surface of a milling pot during mechanical milling, and a vitrification step for synthesizing sulfide-based glass by carrying out mechanical milling on the raw material composition to which the adhesion inhibitor has been added.

14 Claims, 4 Drawing Sheets

COMPARATIVE EXAMPLE

PROCESS FOR PRODUCING SULFIDE-BASED SOLID ELECTROLYTE

BACKGROUND OF THE INVENTION

1. Field of the Invention

The invention relates to a process for producing a sulfide-based solid electrolyte useful as a solid electrolyte for, for example, all-solid-state lithium batteries, and more particularly, to a process for producing a sulfide-based solid electrolyte having superior production efficiency by eliminating the need to remove adhered substances formed on the inner surface of the milling pot during mechanical milling.

2. Description of the Related Art

Accompanying the rapid proliferation of information-related devices and communication devices such as personal computers, video cameras and cell phones in recent years, increasing emphasis has been placed on the development of batteries for use as power supplies of these devices. In addition, in the automobile industry as well, development is proceeding on high-output, high-capacity batteries for use in electric cars and hybrid vehicles. At present, among the various types of batteries available, lithium batteries are attracting attention from the viewpoint of their high energy density.

Since lithium batteries that are currently commercially available use organic electrolytes that use a flammable organic solvent as a solvent, the attachment of a safety device for inhibiting temperature rises during a short-circuit as well as improvements are in terms of structure and materials to prevent short-circuits are required.

In contrast, since all-solid-state lithium batteries, which replace the liquid electrolyte with a solid electrolyte to make the battery entirely solid state, do not use a flammable organic solvent therein, the safety device can be simplified thereby leading to reduced production costs and superior productivity. In addition, sulfide-based solid electrolytes are conventionally used for the solid electrolyte used in all-solid-state lithium batteries. Moreover, examples of processes used to produce sulfide-based solid electrolytes include mechanical milling and rapid melt cooling.

Japanese Patent Application Publication No. 11-134937 (JP-A-11-134937), for example, discloses a process for producing ion-conducting sulfide glass by vitrifying a raw material of ion-conducting sulfide glass by mechanical milling. Moreover, Japanese Patent Application Publication No. 2004-265685 (JP-A-2004-265685) and Japanese Patent Application Publication No. 2003-208919 (JP-A-2003-208919) disclose a process for producing lithium ion-conducting sulfide glass using mechanical milling. On the other hand, a process for producing a lithium ion-conducting solid electrolyte using rapid melt cooling is described in Japanese Patent Application Publication No. 9-283156 (JP-A-9-283156).

In general, mechanical milling offers the advantage of allowing a desired sulfide glass to be more easily obtained in comparison with rapid melt cooling since it enables treatment to be carried out at normal temperatures. However, raw material compositions of sulfide-based glass are comparatively soft due to the presence of sulfur (S) contained therein, and there was also the problem of adhered substances, including unreacted raw material composition, being formed on the inner surface of the milling pot during mechanical milling. Consequently, it was necessary to periodically remove adhered substances formed on the inner surface of the pot, thereby resulting in the problem of poor production efficiency.

SUMMARY OF THE INVENTION

The invention provides a process for producing a sulfide-based solid electrolyte having superior production efficiency by eliminating the need to remove adhered substances formed on the inner surface of the milling pot during mechanical milling.

In one aspect thereof, the invention relates to a process for producing a sulfide-based solid electrolyte including: a step of preparing a raw material composition containing at least sulfur (S); a step of adding to the raw material composition an adhesion inhibitor that inhibits formation of adhered substances, including the unreacted raw material composition, on the inner surface of a milling pot during mechanical milling; and a step of synthesizing sulfide-based glass by carrying out mechanical milling on the raw material composition to which the adhesion inhibitor has been added.

According to this invention, the formation of adhered substances on the inner surface of the milling pot can be inhibited by adding an adhesion inhibitor of the raw material composition and carrying out mechanical milling. As a result, conventionally performed removal of adhered substances is no longer required, thereby making it possible to improve work efficiency. Moreover, the synthesis time of the sulfide-based glass can be shortened considerably since mechanical milling is carried out uniformly on the raw material composition. Moreover, sulfide-based glass having a homogeneous composition can be synthesized since mechanical milling is carried out uniformly.

The adhesion inhibitor is preferably a liquid having the property of not generating hydrogen sulfide in a reaction with the raw material composition. The use of such a liquid makes it possible to improve the dispersibility of the raw material composition in the milling pot, thereby enabling the formation of adhered substances to be inhibited.

The liquid is preferably an aprotic liquid. This is because an aprotic liquid can prevent the formation of hydrogen sulfide.

The aprotic liquid is preferably a non-polar aprotic liquid, and the non-polar aprotic liquid is more preferably an alkane that is a liquid at normal temperature (25° C.). This is because such as alkane is able to effectively prevent formation of hydrogen sulfide.

The alkane that is a liquid at normal temperature (25° C.) is preferably n-heptane. Because the SP value of the n-heptane is small (the polarity of the n-heptane is small), it is possible to effectively suppress a reaction between the n-heptane and a sulfide-based solid electrolyte (including the unreacted raw material composition), thereby suppressing deterioration of the sulfide-based solid electrolyte. Thus, it is possible to improve Li ion conductivity.

The adhesion inhibitor may also be a gel having the property of not generating hydrogen sulfide in a reaction with the raw material composition. The use of such a gel makes it possible to improve dispersibility of the raw material composition in the milling pot, thereby enabling the formation of adhered substances to be inhibited.

The raw material composition preferably further contains Li. This is because lithium allows the obtaining of a sulfide-based solid electrolyte useful as a solid electrolyte for an all-solid-state lithium battery, for example.

The raw material composition preferably contains at least $Li_2S$ and $P_2S_5$. This is because these compounds allow the obtaining of a sulfide-based solid electrolyte having superior Li ion conductivity.

The $Li_2S$ and $P_2S_5$ preferably satisfy the relationship of $Li_2S:P_2S_5=70:30$ (molar ratio). This allows the obtaining of a sulfide-based solid electrolyte having even more superior Li ion conductivity.

The mechanical milling is preferably milling that uses a planetary ball mill. This is because the use of a planetary ball mill enables the raw material composition to be vitrified efficiently.

According to the invention, effects are demonstrated such as eliminating the need for removal of adhered substances, considerably shortening the synthesis time of sulfide-based glass, and allowing the obtaining of sulfide-based glass having a homogeneous composition.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
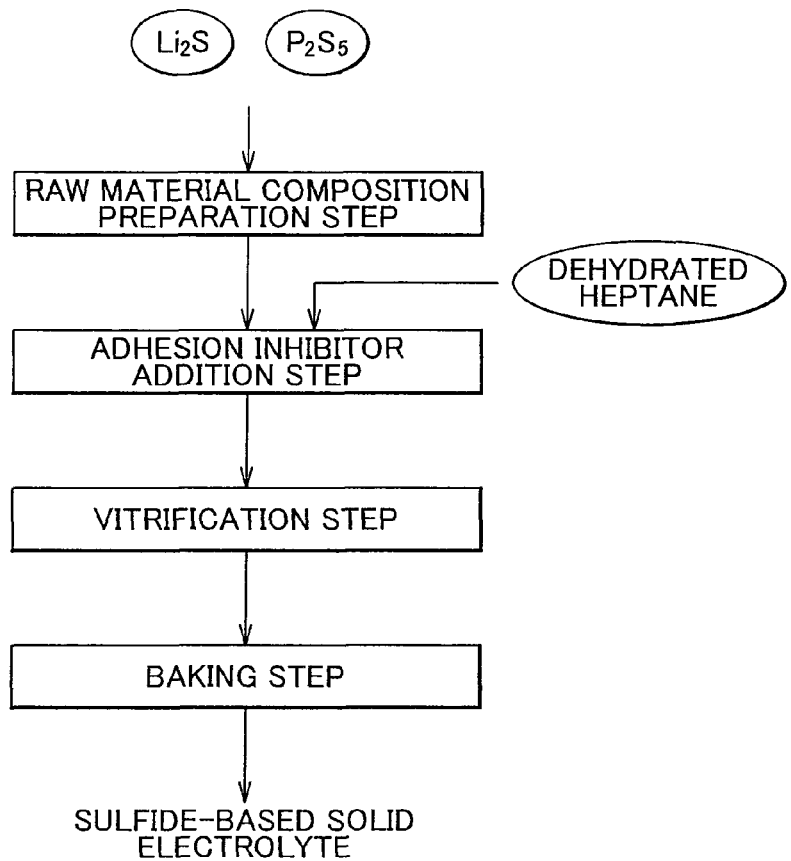
FIG. 1 is a flow chart showing an example of the process for producing, a sulfide-based solid electrolyte of the invention.

FIG. 1 is a flow chart showing an example (embodiment) of a process for producing a sulfide-based solid electrolyte of the invention. In the process for producing a sulfide-based solid electrolyte shown in FIG. 1, lithium sulfide ($Li_2S$) and phosphorous pentasulfide ($P_2S_5$) are first prepared as raw materials followed by mixing at a prescribed ratio to prepare a raw material composition (raw material composition preparation step). Next, the raw material composition and grinding balls are placed in a mechanical milling pot followed by the further addition of dehydrated heptane (adhesion inhibitor) to the pot and sealing (adhesion inhibitor addition step). Next, by attaching the milling pot to a planetary ball mill and carrying out mechanical milling, the raw material composition is converted to an amorphous form to synthesize powdered sulfide-based glass (vitrification step). Next, the powdered sulfide-based glass is baked to synthesize powdered sulfide-based glass ceramic (baking step). This sulfide-based glass ceramic is the target sulfide-based solid electrolyte in FIG. 1.

Here, the sulfide-based solid electrolyte obtained according to this embodiment refers to a concept that includes both the sulfide-based glass ceramic obtained in the baking step described above, as well as the sulfide-based glass obtained in the vitrification step. Namely, the sulfide-based solid electrolyte obtained according to this embodiment may be the sulfide-based glass obtained in the vitrification step or the sulfide-based glass ceramic obtained by baking the sulfide-based glass.

According to this embodiment, adhered substances can be inhibited from being formed on the inner surface of the milling pot by carrying out mechanical milling after adding an adhesion inhibitor to the raw material composition. As a result, the conventionally carried out removal of adhered substances is no longer necessary, thereby making it possible to improve work efficiency. Moreover, since mechanical milling is carried out uniformly on the raw material composition, time required to synthesize the sulfide-based glass can be shortened considerably. Moreover, since uniform mechanical milling is carried out, sulfide-based glass can be synthesized having a homogeneous composition.

Figure 2:
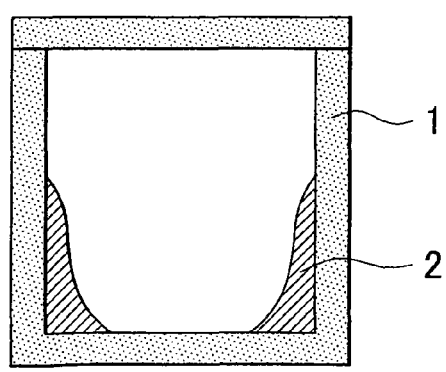
FIG. 2 is a schematic cross-sectional view for explaining adhered substances formed during mechanical milling.

FIG. 2 is a schematic cross-sectional view for explaining adhered substances formed during conventional mechanical milling. As shown in FIG. 2, since the raw material composition contains sulfur (S) and is comparatively soft, in the case of conventional mechanical milling, an adhered substance 2 containing unreacted raw material composition ends up forming on the inner surface of a milling pot 1. Consequently, in order to obtain sulfide-based glass having a homogeneous composition, it was necessary to scrape off the adhered substance 2 formed on the inner surface of the milling pot 1 resulting in the problem of poor production efficiency. This problem caused by adhered substances is unique to, the case of using a soft raw material composition containing sulfur (S). In contrast, in this embodiment, the formation of adhered substances can be inhibited by adding an adhesion inhibitor. As a result, it is no longer necessary to remove the adhered substances, the time required to synthesize the sulfide-based glass can be shortened considerably, and sulfide-based glass can be obtained having a homogeneous composition as previously described. The following provides a detailed explanation of each step of the process for producing a sulfide-based solid electrolyte of this embodiment. Furthermore, each of the steps described to follow are normally carried out in an inert gas atmosphere (such as in an Ar gas atmosphere).

1. Raw Material Composition Preparation Step

First, an explanation is provided of the raw material composition preparation step in this embodiment. The raw material composition preparation step in this embodiment is a step in which a raw material composition is prepared that at least contains sulfur (S).

There are no particular limitations on the composition of the raw material composition provided it at least contains sulfur (S), and the composition thereof is preferably suitably selected depending on the intended use of the target sulfide-based solid electrolyte. For example, in the case of producing a sulfide-based solid electrolyte to be used in an all-solid-state lithium battery, the raw material composition preferably further contains Li in addition to S. This is done to obtain a sulfide-based solid electrolyte having superior Li ion conductivity. Moreover, the raw material composition preferably further contains a third component A in addition to the S and Li. Examples of the third component A include at least one type selected from the group consisting of P, Ge, B, Si, I, Al, Ga and As, with P being particularly preferable.

There are no particular limitations on the raw material compounds used in the raw material composition provided a raw material composition having a composition as described above can be obtained, and examples of such compounds include $Li_2S$, $P_2S_5$, $P_2S_3$, $SiS_2$, $AlS_2$, $B_2S_2$, $GeS_2$, Li, S, P, $Ga_2S$, $As_2S_3$ and $Sb_2S_3$. In particular, the raw material composition preferably contains at least $Li_2S$ and $P_2S_5$. This is because a sulfide-based solid electrolyte can be obtained having superior Li ion conductivity. In this case, the raw material composition may contain only $Li_2S$ and $P_2S_5$, or it may contain other compounds in addition to the $Li_2S$ and $P_2S_5$.

There are no particular limitations on the contents of the compounds in the raw material composition, and the contents are preferably suitably selected according to the target composition of the raw material composition. For example, in the case the raw material composition contains $Li_2S$ and $P_2S_5$, the molar ratio of $Li_2S$ to $P_2S_5$ is preferably 68:32 to 74:26 (molar ratio), and the ratio of $Li_2S:P_2S_5$ is particularly preferably 70:30 (molar ratio). This is because a sulfide-based solid electrolyte can be obtained having even more superior Li ion conductivity.

Furthermore, examples of compositions of the target sulfide-based solid electrolyte include $70Li_2S$-$30P_2S_5$, $80Li_2S$-$20P_2S_5$, $75Li_2S$-$25P_2S_5$, $Li_2S$—$P_2S_5$, $Li_2S$—$SiS_2$ and $LiGe_{0.25}P_{0.75}S_4$.

2. Adhesion Inhibitor Addition Step

Next, an explanation is provided of the adhesion inhibitor addition step in this embodiment. The adhesion inhibitor addition step is a step in which an adhesion inhibitor is added to the above-mentioned raw material composition for inhibiting the formation of adhered substances containing the unreacted raw material composition on the inner surfaces of a milling pot during mechanical milling.

There are no particular limitations on the adhesion inhibitor used in this embodiment provided it has the property of not generating hydrogen sulfide in a reaction with the raw material composition. The adhesion inhibitor normally has the property of not generating hydrogen sulfide not only in a reaction with the raw material composition, but also in reactions with sulfide-based glass and precursors thereof. Examples of forms of the adhesion inhibitor include liquids, gels and solids.

(1) Case of a Liquid Adhesion Inhibitor

In this embodiment, the adhesion inhibitor is preferably a liquid having the property of not generating hydrogen sulfide in a reaction with the raw material composition. The use of such a liquid makes it possible to improve the dispersibility of the raw material composition in the milling pot, thereby making it possible to inhibit the formation of adhered substances. Furthermore, in the case of using such a liquid, it is suitable to use so-called wet mechanical milling. Since wet mechanical milling typically has lower shearing force than dry mechanical milling, it has conventionally not been used for the production of solid electrolytes requiring adequate vitrification. In addition, suitably selecting the type of liquid in consideration of the boiling point of the liquid offers the advantage of being able to easily remove the adhesion inhibitor by drying only.

There are no particular limitations on the above-mentioned liquid provided it has a desired fluidity and has the property of not generating hydrogen sulfide in a reaction with the raw material composition. Hydrogen sulfide is generally generated as a result of protons that have dissociated from molecules of the liquid reacting with the raw material composition and sulfide-based glass. Consequently, the liquid preferably has aprotic properties to a degree that does not result in the formation of hydrogen sulfide. Namely, the liquid is preferably an aprotic liquid. This is because an aprotic liquid is able to prevent the formation of hydrogen sulfide. In addition, aprotic liquids used in this embodiment can normally be divided into polar aprotic liquids and non-polar aprotic liquids.

There are no particular limitations on the polar aprotic liquid, and examples include ketones such as acetone, nitriles such as acetonitrile, amides such as N,N-dimethylformamide (DMF) and sulfoxides such as dimethylsulfoxide (DMSO).

One example of a non-polar aprotic liquid is an alkane that is a liquid at normal temperature (25° C.). The alkane may be a chain alkane or a cyclic alkane. The number of carbon atoms of the alkane is preferably, for example, 5 or more. On the other hand, there are no particular limitations on the upper limit on the number of carbon atoms of the alkane provided it is a liquid at normal temperature. Specific examples of the alkane include pentane, hexane, heptane, octane, nonane, decane, undecane, dodecane and paraffin. Furthermore, the chain alkane may have a branch. The chain alkane is preferably a straight-chain alkane. Specific examples of the straight-chain alkane include n-heptane and n-dacane, and the n-heptane is more preferable. Because the SP value of the n-heptane is small, it is possible to effectively suppress a reaction with between the n-haptane and a sulfide-based solid electrolyte (including the unreacted raw material composition), thereby suppressing deterioration of the sulfide-based solid electrolyte. Thus, it is possible to improve Li ion conductivity. In addition, the number of carbon atoms of the cyclic alkane is preferably, for example, 5 or more and particularly preferably 6 or more. On the other hand, there are no particular limitations on the upper limit of the number of carbon atoms of the cyclic alkane provided it is a liquid at normal temperature. Specific examples of the cyclic alkane include cyclopentane, cyclohexane, cycloheptane, cyclooctane and cycloparaffin.

In addition, other examples of non-polar aprotic liquids include aromatic hydrocarbons such as benzene, toluene or xylene, chain ethers such as diethyl ether or dimethyl ether, cyclic ethers such as tetrahydrofuran, alkyl halides such as chloroform, methyl chloride or methylene chloride, esters such as ethyl acetate, and fluorine compounds such as fluorobenzene, fluoroheptane, 2,3-dihydroperfluoropentane or 1,1,2,2,3,3,4-heptafluorocyclopentane.

The polarity of the aprotic liquid can be evaluated using a solution parameter (SP value). The aprotic liquid with lower polarity is more preferable. In other words, the aprotic liquid with a smaller SP value ($MJ/cm^3$) is more preferable. More specifically, the SP value of the aprotic liquid is preferably equal to or smaller than 18.5, and is more preferably equal to or smaller than 16. By using the aprotic liquid with a low SP value, it is possible to effectively suppress a reaction between the aprotic liquid and the sulfide-based solid electrolyte (including the unreacted raw material composition), thereby suppressing deterioration of the sulfide-based solid electrolyte. Thus, it is possible to improve Li ion conductivity.

The above-mentioned liquid is normally a liquid at normal temperature (25° C.). The boiling point of the liquid is preferably within the range of, for example, 60 to 300° C., and more preferably within the range of 80 to 200° C. If the boiling point of the liquid is excessively low, it ends up vaporizing within the milling pot and may not be able to inhibit the formation of adhered substances, while if the boiling point is excessively high, it may be difficult to remove the liquid.

In addition, the above-mentioned liquid used in this embodiment preferably has a low water content. This is because a low water content makes it possible to inhibit the formation of hydrogen sulfide. The amount of water contained in the liquid is preferably, for example, 100 ppm or less, and is more preferably 50 ppm or less. An example of a method for lowering the water content is distillation. Namely, the liquid is preferably that which has undergone distillation.

In this embodiment, there are no particular limitations on the amount of the liquid added to the raw material composition provided the formation is adhered substances is able to be inhibited. The amount of the liquid is preferably, for example, 50 parts by weight or more, more preferably 100 parts by weight or more, and even more preferably 200 parts by weight or more, with respect to 100 parts by weight of the raw material composition. If the amount of the liquid added is excessively low, there is the possibility of the formation of adhered substances not being inhibited. On the other hand, the amount of the liquid is preferably, for example, 1000 parts by weight or less, and more preferably 500 parts by weight or less, with respect to 100 parts by weight of the raw material composition. If the amount of the liquid added is excessively high, there is the possibility of synthesis of sulfide-based glass requiring an excessively long period of time.

(2) Case of a Gelatinous Adhesion Inhibitor

In this embodiment, the adhesion inhibitor may also be a gel having the property of not generating hydrogen sulfide in a reaction with the raw material composition. The use of such a gel makes it possible to improve dispersibility of the raw material composition in the milling pot, thereby enabling inhibition of the formation of adhered substances.

There are no particular limitations on the gel provided it has the property of not generating hydrogen sulfide in a reaction with the raw material composition. In addition, the amount of the gel added to the raw material composition is preferably suitably selected according to the amount and type of the raw material composition.

(3) Case of a Solid Adhesion Inhibitor

In this embodiment, the adhesion inhibitor may also be a solid having the property of not generating hydrogen sulfide in a reaction with the raw material composition. The use of such a solid makes it possible to improve dispersibility of the raw material composition in the milling pot, thereby enabling inhibition of the formation of adhered substances.

There are no particular limitations on the solid provided it has the property of not generating hydrogen sulfide in a reaction with the raw material composition. An example of the solid is a ball (adhesion inhibition ball) smaller than crushing balls used in mechanical milling. The addition of an adhesion inhibition ball makes it possible to reduced adhesion between the inner surface of the milling pot and adhered substances. An example of the material of such an adhesion inhibition ball is the same material as that of crushing balls used in mechanical milling to be described later. In addition, although there are no particular limitations on the diameter of the adhesion inhibition ball provided it is smaller than the crushing balls, it is preferably, for example, 3 mm or less. In addition, the amount of the solid added to the raw material composition is preferably suitably selected according to the amount and type of raw material composition.

3. Vitrification Step

Next, an explanation is provided of the vitrification step in this embodiment. The vitrification step is a step for synthesizing sulfide-based glass by carrying out mechanical milling on the raw material composition to which the adhesion inhibitor has been added as previously described. As was previously described, the sulfide-based glass obtained in the vitrification step may be used as a sulfide-based solid electrolyte.

There are no particular limitations on the type of mechanical milling apparatus used in this embodiment provided it causes vitrification of the raw material composition, and examples include ball mill apparatuses such as a planetary ball mill, rotary ball mill, agitating ball mill or vibration ball mill, and crushing machines using a ring. A planetary ball mill is particularly preferable. This is because a planetary ball mill is able to efficiently vitrify the raw material composition.

Various conditions for the above-mentioned mechanical milling are preferably set to a degree that allows the obtaining of a desired sulfide-based glass, and are preferably suitably selected according to the type of mechanical milling. For example, in the case of synthesizing sulfide-based glass with a planetary ball mill, normally the raw material composition and grinding balls are added to the milling pot followed by carrying out treatment for a prescribed rotational speed and time. In general, the formation rate of sulfide-based glass increases the higher the rotational speed, while the conversion rate of the raw materials to sulfide-based glass increases as the duration of treatment time becomes longer. The rotational speed of the planetary ball mill is, for example, within the range of 100 to 500 rpm, and preferably within the range of 200 to 400 rpm. In addition, the treatment time when using the planetary ball mill is preferably an amount of time of a degree to which vitrification of the raw material composition is able to proceed adequately.

4. Baking Step

Next, an explanation is provided of the baking step in this embodiment. The baking step is a step for obtaining sulfide-based glass ceramic by carrying out baking treatment for improving crystallinity of sulfide-based glass. As was previously described, the sulfide-based glass ceramic obtained in the baking step may be used as a sulfide-based solid electrolyte.

There are no particular limitations on the temperature of baking treatment provided it is a temperature that allows the obtaining of a desired sulfide-based glass ceramic, and for example, is within the range of 150 to 360° C. and preferably within the range of 200 to 350° C. If the temperature of baking treatment is too low, the glass transition temperature of the sulfide-based glass may not be reached thereby preventing crystallization from proceeding, while if the temperature of baking treatment is too high, a desired crystal structure may not be able to be formed. In addition, the duration of baking treatment is, for example, within the range of 1 minute to 10 hours, and preferably within the range of 0.5 to 3 hours.

5. Other

The sulfide-based solid electrolyte obtained according to this embodiment is useful, for example, as a solid electrolyte for an all-solid-state battery (and particularly an all-solid-state lithium battery). For example, a powder of the sulfide-based solid electrolyte can be compression molded for use as a solid electrolyte film. In addition, a method for producing an all-solid-state battery can also be provided that uses a sulfide-based solid electrolyte obtained according to the process for producing a sulfide-based solid electrolyte described above.

This invention is not limited to the embodiments thus described. These embodiments are intended to exhibit examples. Anything that embodies configurations substantially equivalent to the technical ideas disclosed in the claims of this invention and provides operational advantage identical to this invention is within the technical scope of the claims of this invention.

The following provides an explanation of specific examples.

Example 1

Lithium sulfide ($Li_2S$) crystals and phosphorous pentasulfide ($P_2S_5$) were used as starting materials. 2 g of these powders were weighed at a molar ratio of 70/30($Li_2S/P_2S_5$) in a dry box in the presence of an argon atmosphere and then placed in a 45 ml zirconia milling pot. Next, 4 g of dehydrated heptane were weighed and placed in the milling pot followed by further placing zirconia grinding balls (diameter: 10 mm, 29 balls) in the milling pot and completely sealing the pot.

The milling pot was then attached to a planetary ball mill followed initially by carrying out milling for several minutes at low speed (rotational speed: 60 rpm) to sufficiently mix the materials. Subsequently, the rotational speed was gradually increased to carry out mechanical milling at 370 rpm for 5 hours, 9 hours and 15 hours, respectively. After drying was performed, glass powder was obtained.

Example 2

Glass powder was obtained in the same manner as Example 1 with the exception of changing the amount of raw material composition to 20 g, changing the amount of dehydrated heptane to 40 g, using a 500 ml zirconia milling pot, and using zirconia grinding balls (diameter: 5 mm, 600 g).

Comparative Example 1

Glass powder was obtained in the same manner as Example 1 with the exception of not adding dehydrated heptane, changing durations of mechanical milling at 370 rpm to 20, 25 and 30 hours, respectively, and scraping off unreacted raw material composition adhered to the surface of the milling pot every 5 hours.

[Evaluation 1]

(1) X-ray Diffraction Measurement

Figure 3:
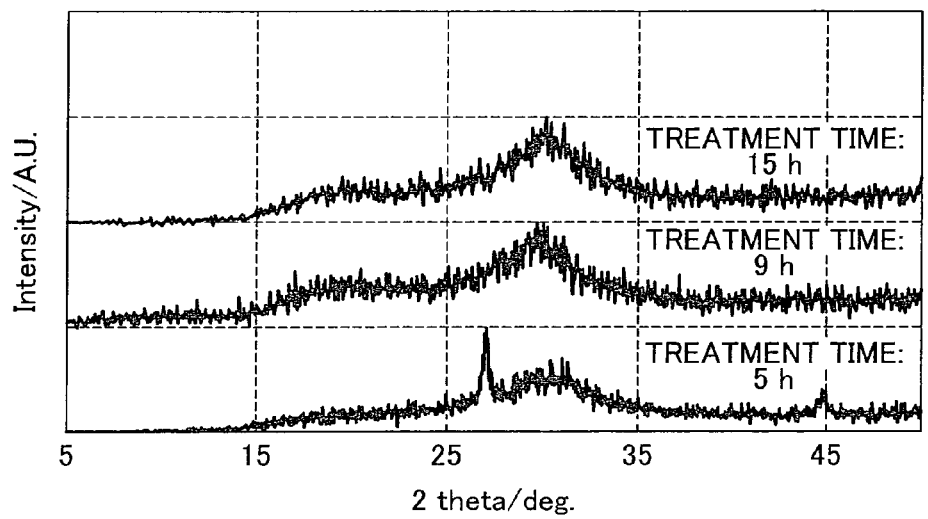
FIG. 3 shows measurement results of X-ray diffraction of glass powder obtained in Example 1.

FIG. 3 shows measurement results of X-ray diffraction of the glass powder obtained in Example 1. As shown in FIG. 3, although a peak was observed for lithium sulfide ($Li_2S$) of the raw material in glass powder mechanically milled for 5 hours, this peak corresponding to ($Li_2S$) of the raw material was no longer observed in glass powders mechanically milled for 9 and 15 hours, thereby confirming the adequate progression of vitrification. Similarly, vitrification was also confirmed to have adequately progressed at 9 hours for the glass powder obtained in Example 2.

Figure 4:
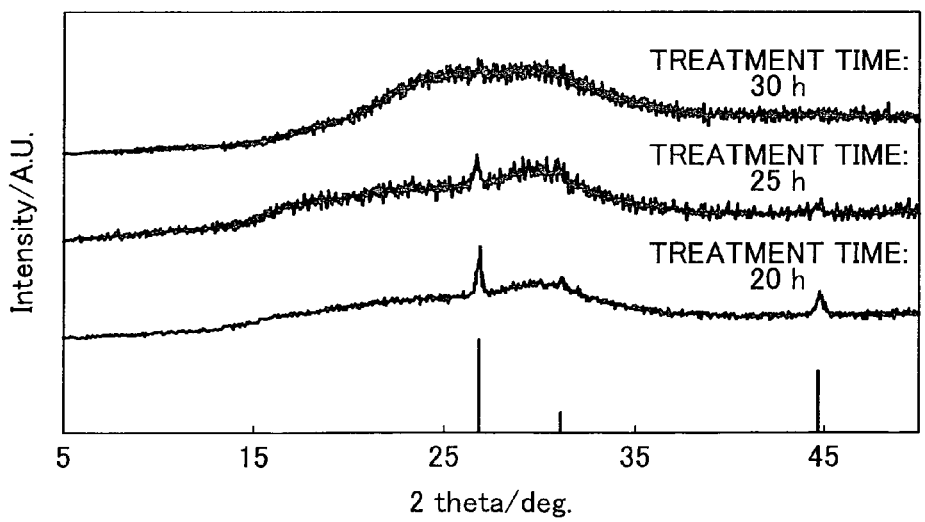
FIG. 4 shows measurement results of X-ray diffraction of glass powder obtained in Comparative Example 1.

On the other hand, FIG. 4 shows measurement results of X-ray diffraction of the glass powder obtained in Comparative Example 1. As shown in FIG. 4, peaks corresponding to ($Li_2S$) of the raw material were observed in the glass powder following mechanical milling for 20 hours and 25 hours. In contrast, the peak corresponding to ($Li_2S$) of the raw material was no longer observed in the glass powder mechanically milled for 30 hours, thereby confirming the adequate progression of vitrification.

Namely, in Comparative Example 1, although it was necessary to carry out mechanical milling for about 30 hours in order to synthesize sulfide-based glass, in Examples 1 and 2, sulfide-based glass was able to be synthesized in about 9 hours. This shortening of synthesis time is thought to be the result of inhibition of adhesion of unreacted raw material to the surface of the milling pot brought about by the addition of an adhesion inhibitor (dehydrated heptane). Moreover, a desired sulfide-based glass was able to be synthesized in Examples 1 and 2 without having to carry out work for removing unreacted raw material every 5 hours as in Comparative Example 1. In addition, although mechanical milling was carried in Example 2 on a scale ten times that of Example 1, a desired sulfide-based glass was confirmed to be able to be synthesized in a short period of time in this case as well.

(2) DSC Measurement

Figure 5:
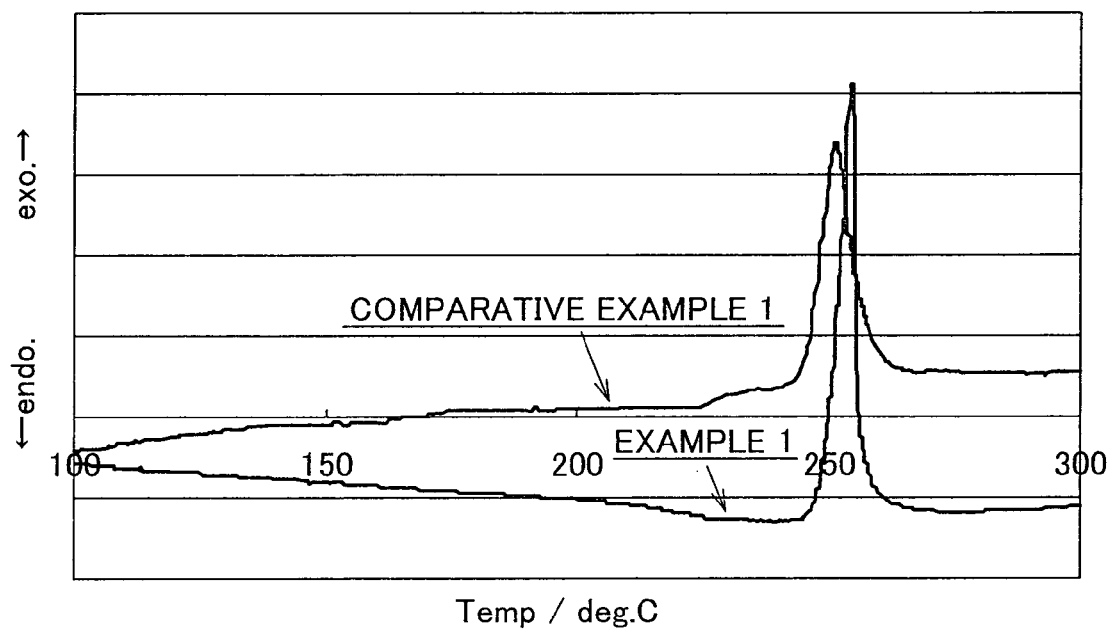
FIG. 5 shows measurement results of DSC on glass powder obtained in Example 1 and glass powder obtained in Comparative Example 1.

FIG. 5 shows measurement results of a differential scanning calorimeter (DSC) for the glass powder obtained in Example 1 (following mechanical milling for 15 hours) and the glass powder obtained in Comparative Example 1 (following mechanical milling for 30 hours). As shown in FIG. 5, Example 1 demonstrated a narrower peak width than Comparative Example 1, thereby confirming that sulfide-based glass having a more homogeneous composition was synthesized in Example 1.

(3) Electrical Conductivity

The glass powder obtained in Example 1 (following mechanical milling for 15 hours) and the glass powder obtained in Comparative Example 1 (following mechanical milling for 30 hours) were respectively heated in an Ar atmosphere under conditions of 290° C. for 2 hours to obtain sulfide-based glass ceramic powder. Next, the resulting sulfide-based glass ceramic powder was molded into pellets at a pressure of 5.1 t/cm². Next, the electrical conductivity (Li ion conductivity) of the resulting pellets was measured according to the alternating current 2-terminal method. As a result, electrical conductivity of the pellets using the glass powder obtained in Example 1 (room temperature (25° C.)) was $1.7 \times 10^{-3}$ S/cm, while the electrical conductivity of pellets using the glass powder obtained in Comparative Example 1 (room temperature (25° C.)) was $1.5 \times 10^{-3}$ S/cm, thereby confirming that both types of pellets have about the same degree of electrical conductivity.

Example 3

Lithium sulfide ($Li_2S$) crystals and phosphorous pentasulfide ($P_2S_5$) were used as starting materials. 2 g of these powders were weighed at a molar ratio of 75/25 ($Li_2S/P_2S_5$) in a dry box in the presence of an argon atmosphere and then placed in a 45 ml zirconia milling pot. Next, 4 g of dehydrated heptane (dehydrated n-heptane) were weighed and placed in the milling pot followed by further placing zirconia grinding balls (diameter: 10 mm, 29 balls) in the milling pot and completely sealing the pot.

The milling pot was then attached to a planetary ball mill followed initially by carrying out milling for several minutes at low speed (rotational speed: 60 rpm) to sufficiently mix the materials. Subsequently, the rotational speed was gradually increased to carry out mechanical milling at 370 rpm for 9 hours. After drying was performed, glass powder was obtained.

Example 4

Glass powder was obtained in the same manner as Example 3 with the exception of using dehydrated n-decane, instead of defydrated n-heptane.

Example 5

Glass powder was obtained in the same manner as Example 3 with the exception of using dehydrated toluene, instead of dehydrated heptane.

Example 6

Glass powder was obtained in the same manner as Example 3 with the exception of using dehydrated xylene, instead of dehydrated heptane.

[Evaluation 2]

Figure 6:
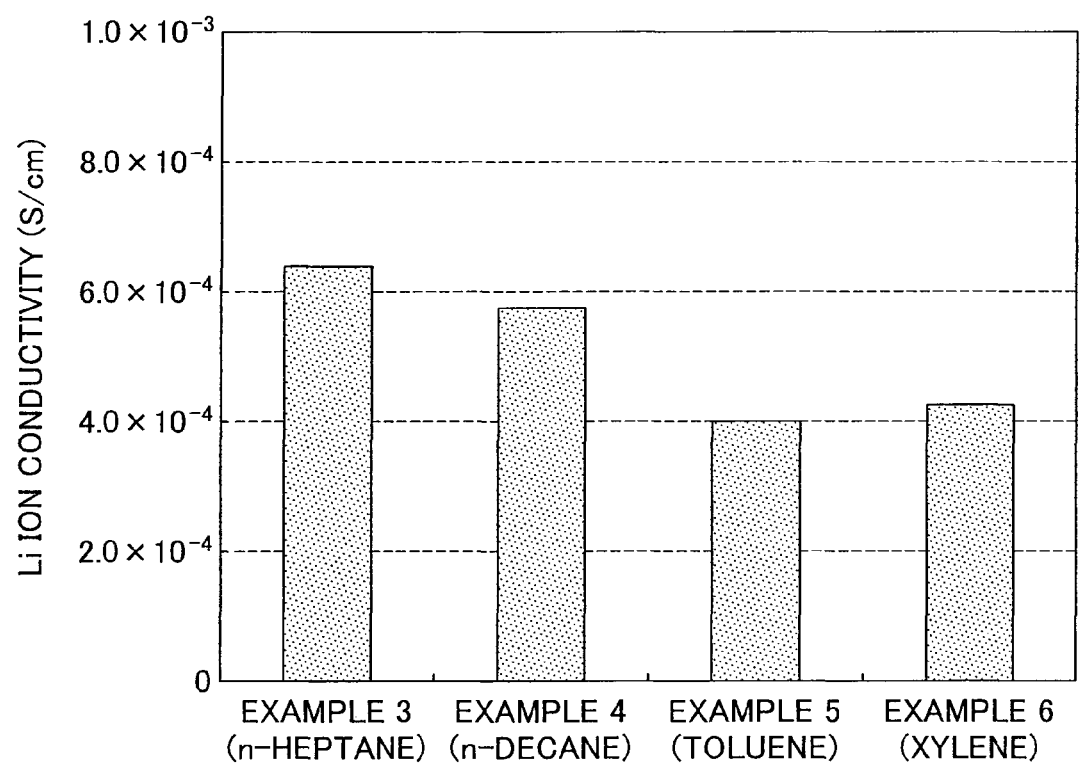
FIG. 6 shows measurement results of Li ion conductivity of glass powder obtained in Examples 3 to 6.

X-ray diffraction was performed on the glass powder obtained in Examples 3 to 6 in the same manner as the manner described above. As a result, it was confirmed that sulfide-based glass was synthesized in each of the Examples 3 to 6. Next, the glass powder obtained in each of the Examples 3 to 6 was molded into pellets at a pressure of 5.1 t/cm². Next, the electrical conductivity (Li ion conductivity) of the resulting pellets (at room temperature (25° C.)) was measured according to the alternating current 2-terminal method. Table 1 and FIG. 6 show measurement results. Table 1 also shows the SP value of the aprotic liquid and the amount of water contained in the aprotic liquid in each of Examples 3 to 6.

TABLE 1

|  | Aprotic liquid | Chain/Cyclic | SP value (MJ/cm$^3$) | Amount of water (ppm) | Li ion Conductivity (S/cm) |
|---|---|---|---|---|---|
| Example 3 | n-heptane | Chain (straight-chain) | 14.4 | 34 | $6.4 \times 10^{-4}$ |
| Example 4 | n-decane | Chain (straight-chain) | 15.6 | 28 | $5.8 \times 10^{-4}$ |
| Example 5 | toluene | Cyclic | 18.2 | 30 | $4.0 \times 10^{-4}$ |
| Example 6 | xylene | Cyclic | 18.0 | 35 | $4.3 \times 10^{-4}$ |

As shown in Table 1 and FIG. 6, it was confirmed that the glass powder obtained in each of Examples 3 to 6 had Li ion conductivity of 10$^{-4}$ S/cm or higher. The glass powder obtained in each of Examples 3 and 4 had higher Li ion conductivity than that of the glass powder obtained in each of Examples 5 and 6. It is considered that because the aprotic liquid with a smaller SP value, that is, the aprotic liquid with lower polarity was used in each of Examples 3 and 4, the reaction between the aprotic liquid and the sulfide-based solid electrolyte (including the unreacted raw material composition) was more effectively suppressed, deterioration of the sulfide-based solid electrolyte was more effectively suppressed, and thus, Li ion conductivity was improved in each of Examples 3 and 4.

The invention claimed is:

1. A process for producing a sulfide-based solid electrolyte, comprising:
    preparing a raw material composition containing at least sulfur;
    adding to the raw material composition an adhesion inhibitor that inhibits formation of adhered substances including the unreacted raw material composition on an inner surface of a milling pot during mechanical milling, the adhesion inhibitor being an alkane that is liquid at normal temperature; and
    synthesizing sulfide-based glass by carrying out mechanical milling on the raw material composition to which the adhesion inhibitor has been added; and
    baking the sulfide-based glass.

2. The production process according to claim 1, wherein the alkane is liquid at 25° C.

3. The production process according to claim 1, wherein the number of carbon atoms of the alkane is 5 or more.

4. The production process according to claim 3, wherein the number of carbon atoms of the alkane is 6 or more.

5. The production process according to claim 4, wherein the alkane that is liquid at normal temperature is n-heptane.

6. The production process according to claim 1, wherein the boiling point of the alkane is 60 to 300° C.

7. The production process according to claim 6, wherein the boiling point of the alkane is 80 to 200° C.

8. The production process according to claim 1, wherein the water concentration in the adhesion inhibitor is 100 ppm or less.

9. The production process according to claim 1, wherein the amount of adhesion inhibitor is 50 to 1000 parts by weight with respect to 100 parts by weight of the raw material composition.

10. The production process according to claim 1, wherein the raw material composition further contains Li.

11. The production process according to claim 1, wherein the raw material composition contains at least Li$_2$S and P$_2$S$_5$.

12. The production process according to claim 11, wherein the molar ratio of Li$_2$S to P$_2$S$_5$ is 68:32 to 74:26.

13. The production process according to claim 12, wherein the molar ratio of Li$_2$S to P$_2$S$_5$ is 70:30.

14. The production process according to claim 1, wherein the mechanical milling is milling that uses a planetary ball mill.

* * * * *